United States Patent
Soma et al.

(10) Patent No.: US 11,595,297 B2
(45) Date of Patent: Feb. 28, 2023

(54) MULTI-VPN MULTI LINK TRAFFIC ROUTING

(71) Applicant: Dell Products L.P., Round Rock, TX (US)

(72) Inventors: Dileep Kumar Soma, Austin, TX (US); Vivek Viswanathan Iyer, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 17/127,249

(22) Filed: Dec. 18, 2020

(65) Prior Publication Data

US 2022/0200895 A1 Jun. 23, 2022

(51) Int. Cl.
*H04L 45/00* (2022.01)
*H04L 45/24* (2022.01)
*H04L 12/46* (2006.01)
*H04L 9/40* (2022.01)

(52) U.S. Cl.
CPC ........ *H04L 45/245* (2013.01); *H04L 12/4633* (2013.01); *H04L 63/0227* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 6,052,361 A | * | 4/2000 | Ansari | H04Q 11/0478 370/235 |
| 9,413,814 B2 | * | 8/2016 | Jackowski | H04L 47/19 |
| 2005/0047329 A1 | * | 3/2005 | Almog | H04L 69/16 370/225 |
| 2017/0366467 A1 | * | 12/2017 | Martin | H04L 12/4625 |
| 2018/0302443 A1 | * | 10/2018 | Weiss | G06F 21/604 |
| 2019/0149475 A1 | * | 5/2019 | Martin | H04L 47/12 370/235 |
| 2022/0156387 A1 | * | 5/2022 | Keller | H04L 63/10 |

* cited by examiner

*Primary Examiner* — Gerald A Smarth
(74) *Attorney, Agent, or Firm* — Terrile, Cannatti & Chambers; Stephen A. Terrile

(57) ABSTRACT

A system, method, and computer-readable medium for performing a traffic routing operation. The traffic routing operation includes: establishing a plurality of virtual private network (VPN) connections within an information handling system; obtaining a configuration policy for each of the plurality of VPN connections, the configuration policy for each of the plurality of VPN connections comprising an indication of at least one type of supported link of a plurality of links; configuring a plurality of queues for packets being communicated via the plurality of virtual private network connections, the plurality of queues being greater than the plurality of VPN connections; creating a tunnel indication for each of the plurality of VPN connections; mapping the tunnel indication for each of the plurality of VP connections to a respective queue of the plurality of queues; and, mapping each queue of the plurality of queues to a link of a particular VPN connection.

20 Claims, 4 Drawing Sheets

MULTI-VPN MULTI LINK TRAFFIC ROUTING

BACKGROUND OF THE INVENTION

Field of the Invention

The present invention relates to information handling systems. More specifically, embodiments of the invention relate to performing a network traffic routing operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a traffic routing operation, comprising: establishing a plurality of virtual private network (VPN) connections within an information handling system; obtaining a configuration policy for each of the plurality of VPN connections, the configuration policy for each of the plurality of VPN connections comprising an indication of at least one type of supported link of a plurality of links; configuring a plurality of queues for packets being communicated via the plurality of virtual private network connections, the plurality of queues being greater than the plurality of VPN connections; creating a tunnel indication for each of the plurality of VPN connections; mapping the tunnel indication for each of the plurality of VP connections to a respective queue of the plurality of queues; and, mapping each queue of the plurality of queues to a link of a particular VPN connection.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: establishing a plurality of virtual private network (VPN) connections within an information handling system; obtaining a configuration policy for each of the plurality of VPN connections, the configuration policy for each of the plurality of VPN connections comprising an indication of at least one type of supported link of a plurality of links; configuring a plurality of queues for packets being communicated via the plurality of virtual private network connections, the plurality of queues being greater than the plurality of VPN connections; creating a tunnel indication for each of the plurality of VPN connections; mapping the tunnel indication for each of the plurality of VP connections to a respective queue of the plurality of queues; and, mapping each queue of the plurality of queues to a link of a particular VPN connection.

In another embodiment the invention relates to a computer-readable storage medium embodying computer program code, the computer program code comprising computer executable instructions configured for: establishing a plurality of virtual private network (VPN) connections within an information handling system; obtaining a configuration policy for each of the plurality of VPN connections, the configuration policy for each of the plurality of VPN connections comprising an indication of at least one type of supported link of a plurality of links; configuring a plurality of queues for packets being communicated via the plurality of virtual private network connections, the plurality of queues being greater than the plurality of VPN connections; creating a tunnel indication for each of the plurality of VPN connections; mapping the tunnel indication for each of the plurality of VP connections to a respective queue of the plurality of queues; and, mapping each queue of the plurality of queues to a link of a particular VPN connection.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing a network traffic routing operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
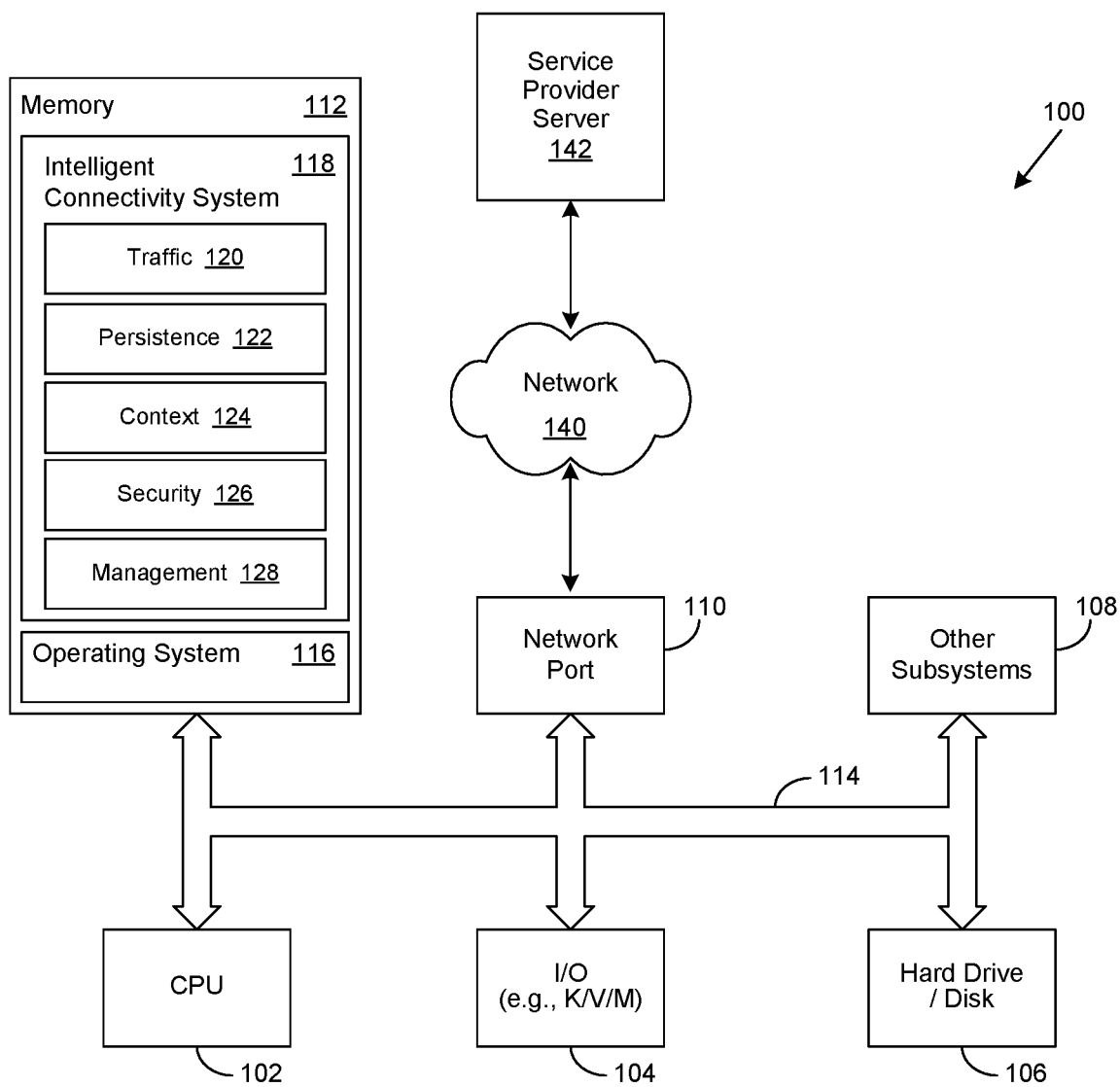
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
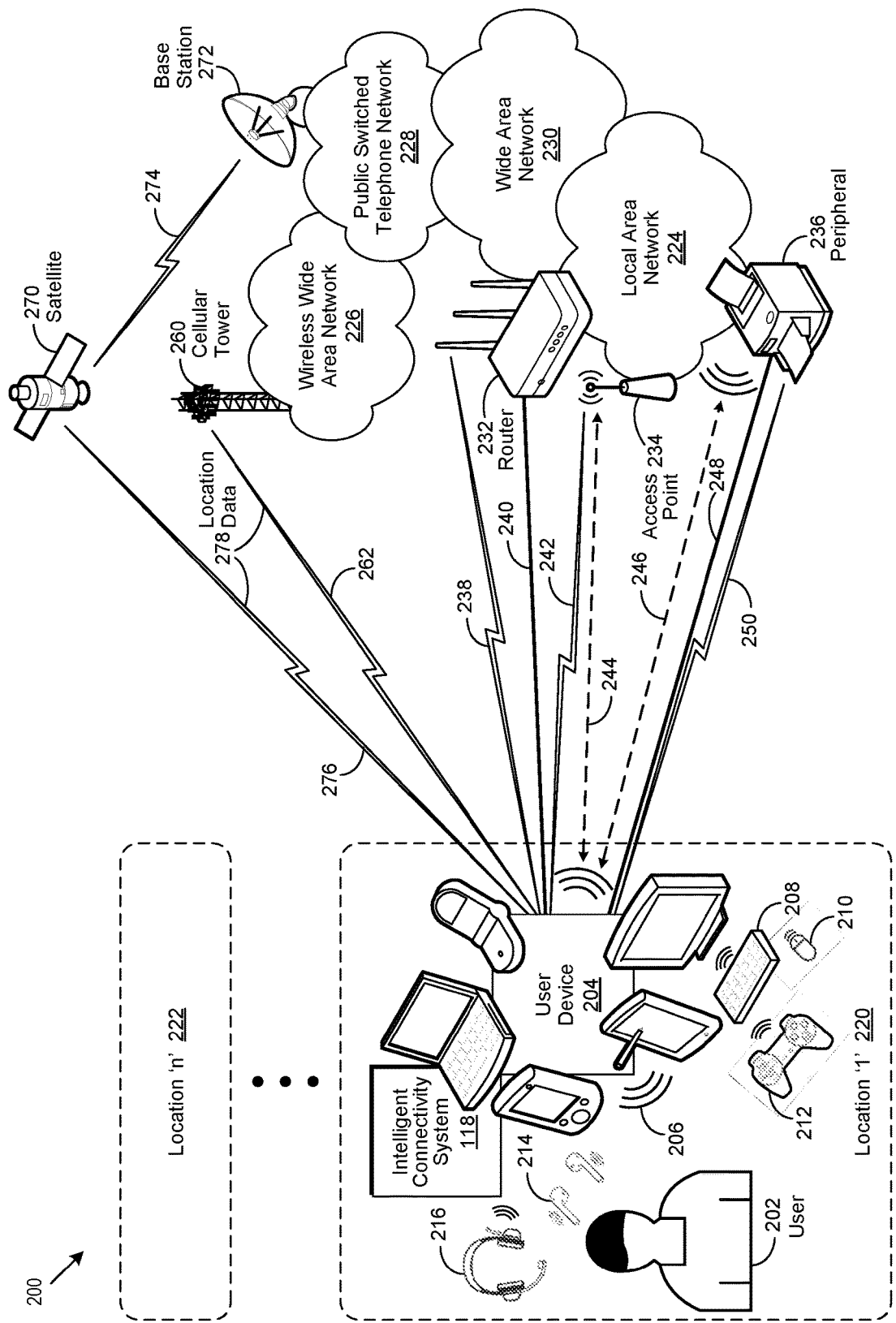
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204. is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Positioning System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276 may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276 according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1'→network tunnel '1', network traffic queue '2'→network tunnel '1', and network traffic queue '3'→no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
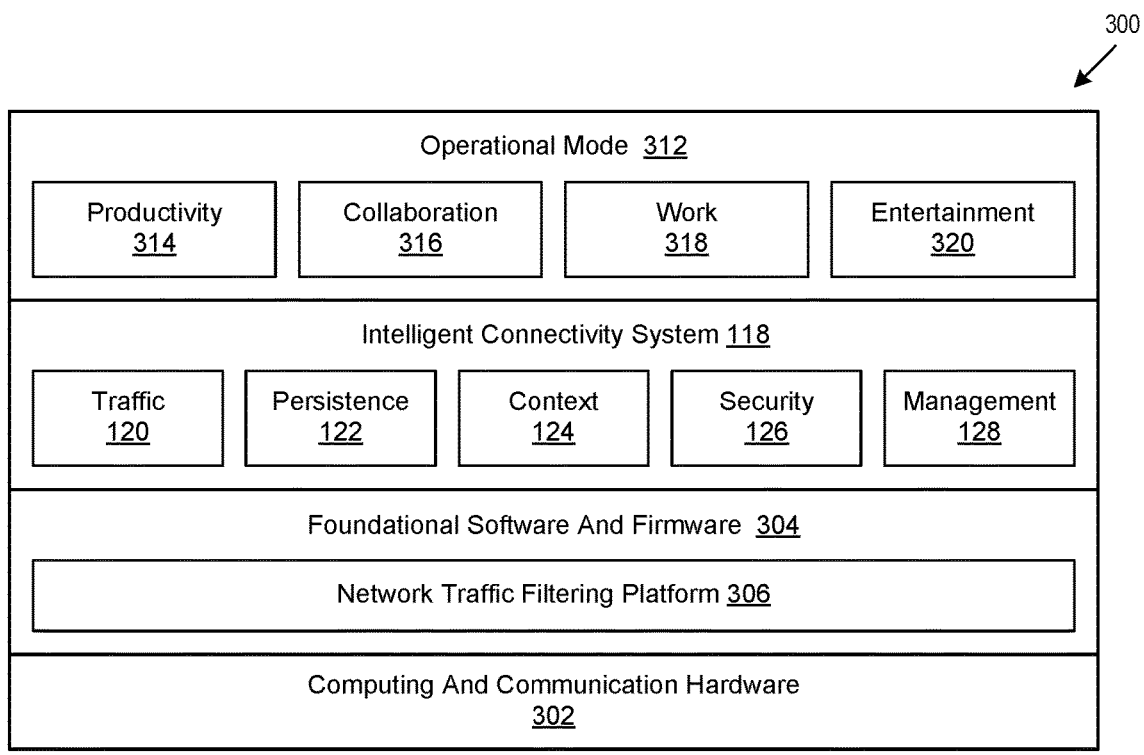
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306, described in greater detail herein.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
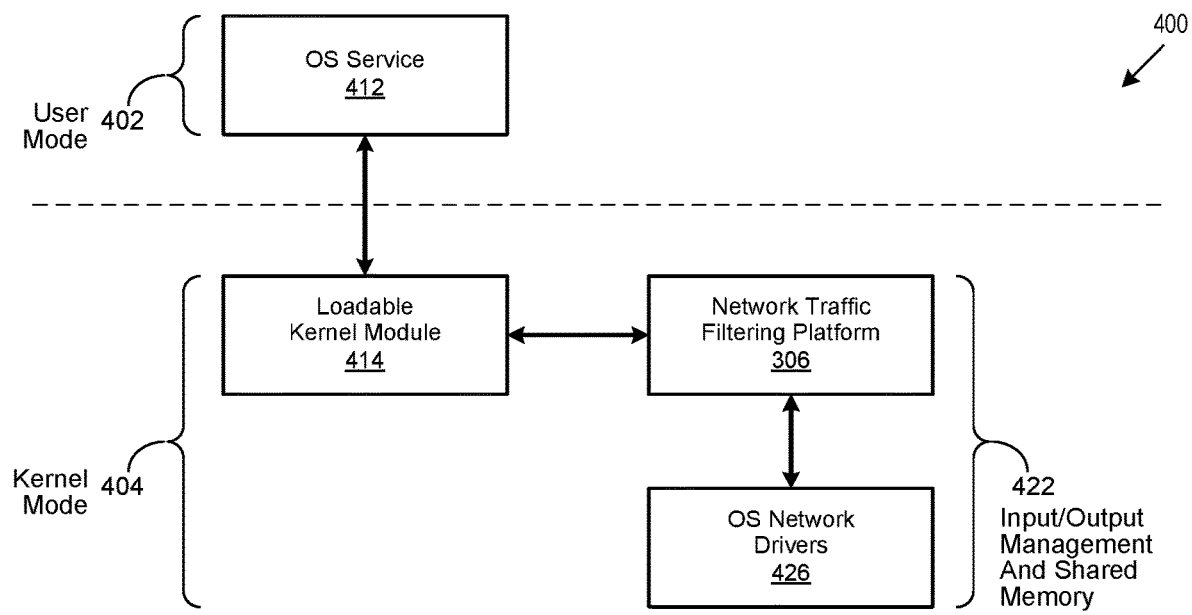
FIG. 4 shows modes of operation used in the performance of a network traffic routing operation.

FIG. 4 shows modes of operation used in the performance of a network traffic routing operation implemented in accordance with an embodiment of the invention. In certain embodiments, a network traffic routing operation 400 may be implemented to include a user mode 402 of operation and a kernel mode 404 of operation. Skilled practitioners of the art will be familiar with a user mode 402 of operation, which refers to when the operating system (OS) of an information handling system (IHS) is running a user application such as a word processor, spreadsheet, and so forth. Those of skill in the art will likewise be aware that core OS components run in kernel mode 404. Likewise, drivers typically run in kernel mode 404, although some may be implemented to run in user mode 402.

In certain embodiments, the transition from user mode 402 to kernel mode 404 may occur when an OS service 412 invokes a loadable kernel module (LKM) 414. In certain embodiments, the OS service 412 may be implemented as a network OS service 412. In certain embodiments, a network OS service 412 may be invoked to establish a network link with a particular network, as described in greater detail herein.

Skilled practitioners of the art will be familiar with a LKM 414, which is an object file containing code to extend the running kernel, also referred to as the base kernel, of an operating system (OS). As typically implemented, LKMs 414 are used to add support for new hardware, as device drivers, or file systems, or for adding system calls, or a combination thereof. It is also common practice to unload a LKM 414 when the functionality it provides is no longer needed in order to free memory and other resources.

Those of skill in the art will likewise be aware that most current Unix-like systems and Microsoft® Windows® support LKMs 414, although they may be referred to by a different name. For example, LKMs are referred to as a kernel loadable module (kld) in FreeBSD, a kernel extension (kext) in macOS®, a kernel extension module in AIX®, and a kernel-mode driver in Windows®. Other known names for an LKM 414 include downloadable kernel module (DKM), kernel loadable module (KLM), and simply kernel module (KMOD).

As skilled practitioners of the art will be aware, LKMs execute in kernel mode 414 as part of an executive, which includes kernel mode 404 OS components that manage input/output (I/O) and shared memory 422 components (generally referred to as an input/output control system), processes and threads, security, and so forth. Those of skill in the art will likewise be aware that LKMs 414 are generally layered, with higher-level drivers typically receive data from applications, filter the data, pass it to a lower-level driver that supports device functionality. In certain embodiments, the network traffic filtering platform 206 performs a network filtering operation. In certain embodiments, the network traffic filtering operation receives data from a particular LKM 414, filters the data, and passes the filtered data on to an OS network driver. In certain embodiments, the network traffic filtering platform 306 may be implemented as a Windows® Filtering Platform. Likewise, in certain embodiments, the OS network driver 426 may be implemented in the form of various WINDOWS® Driver Model (WDM) drivers.

Figure 5:
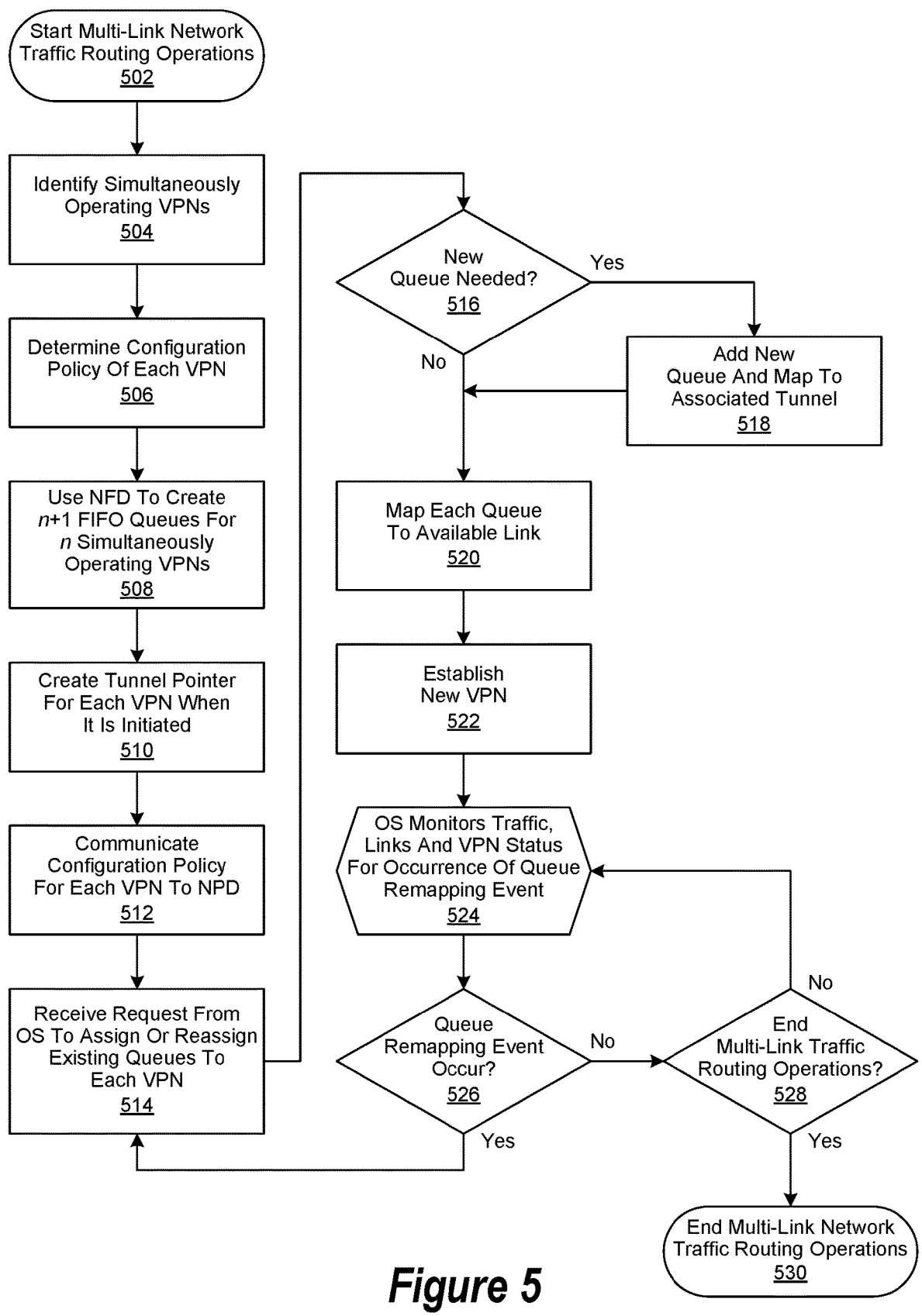
FIG. 5 shows a flowchart of the performance of multi-link network traffic routing operations.

FIG. 5 shows a flowchart of multi-link network traffic routing operations performed in accordance with an embodiment of the invention. In this embodiment, multi-link network traffic routing operations are begun in step 503, followed by the identification of simultaneously operating virtual private networks (VPNs) in step 504. The configuration policy respectively associated with each identified VPN is then determined in step 506. A network traffic filtering platform, described in greater detail herein, is then used in step 508 to create n+1 first-in, first-out (FIFO) network traffic queues, where 'n' is defined as the number of previously identified VPNs. Thereafter, a network tunnel pointer, familiar to skilled practitioners of the art, is then created in step 510 for each identified VPN when it is initiated.

Each VPN's associated configuration policy is then communicated to the network traffic filtering platform in step 512, followed by the receipt of a request in step 514 from the user device's operating system (OS) to assign, or reassign, existing network traffic queues to the previously-identified VPNs. A determination is then made in step 516 whether a new network traffic queue is needed. If so, then a new network traffic queue is generated and mapped to an associated VPN tunnel in step 518. Thereafter, or if it was determined in step 516 that a new network traffic queue was not needed, then each available network traffic queue is mapped to an available network link in step 520, followed by the establishment of a new VPN in step 522.

Ongoing operations are then performed in step 524 for the OS of the user device to monitor network traffic, network links, and the status of each VPN for the occurrence of a network traffic queue remapping event. A determination is then made in step 526 whether a network traffic queue remapping event has occurred. If so, then the process is continued, proceeding with step 514. Otherwise, a determination is made in step 528 whether to end multi-link network traffic routing operations. If not, then the process is continued, proceeding with step 524. Otherwise, multi-link network traffic routing operations are ended in step 530.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a traffic routing operation, comprising:
    establishing a plurality of virtual private network (VPN) connections via an information handling system;
    obtaining a configuration policy for each of the plurality of VPN connections, the configuration policy for each of the plurality of VPN connections comprising an indication of at least one type of supported link of a plurality of links;
    configuring a plurality of queues for packets being communicated via the plurality of virtual private network connections, the plurality of queues being greater than the plurality of VPN connections;
    creating a tunnel indication for each of the plurality of VPN connections;
    mapping the tunnel indication for each of the plurality of VPN connections to a respective queue of the plurality of queues; and,
    mapping each queue of the plurality of queues to a link of a particular VPN connection, the mapping using the configuration policy for each of the plurality of VPN connections.

2. The method of claim 1, wherein:
    the traffic routing operation includes a user mode of operation, the user mode of operation executing an operating system service.

3. The method of claim 1, wherein:
    the traffic routing operation includes a kernel mode of operation, the kernel mode of operation performing a multi-link network traffic operation, the multi-link network traffic operation interacting with an input/output control system.

4. The method of claim 3, wherein:
    the input/output control system comprises a filtering platform, the filtering platform performing a network filtering operation.

5. The method of claim 3, wherein:
    the input/output control system comprises a loadable kernel module, the loadable kernel module interacting with an input/output control system of the information handling system.

6. The method of claim 1, further comprising:
    performing a many to many mapping of the plurality of VPN connections to the plurality of links, the many to many mapping being optimized for a multi-link configuration using network link attributes to determine which link is suited for assignment of a particular VPN connection.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        establishing a plurality of virtual private network (VPN) connections via an information handling system;
        obtaining a configuration policy for each of the plurality of VPN connections, the configuration policy for each of the plurality of VPN connections comprising an indication of at least one type of supported link of a plurality of links;

configuring a plurality of queues for packets being communicated via the plurality of virtual private network connections, the plurality of queues being greater than the plurality of VPN connections;

creating a tunnel indication for each of the plurality of VPN connections;

mapping the tunnel indication for each of the plurality of VPN connections to a respective queue of the plurality of queues; and, mapping each queue of the plurality of queues to a link of a particular VPN connection, the mapping using the configuration policy for each of the plurality of VPN connections.

8. The system of claim 7, wherein:
the traffic routing operation includes a user mode of operation, the user mode of operation executing an operating system service.

9. The system of claim 7, wherein:
the traffic routing operation includes a kernel mode of operation, the kernel mode of operation performing a multi-link network traffic operation, the multi-link network traffic operation interacting with an input/output control system.

10. The system of claim 9, wherein:
the input/output control system comprises a filtering platform, the filtering platform performing a network filtering operation.

11. The system of claim 7, wherein:
the input/output control system comprises a loadable kernel module, the loadable kernel module interacting with an input/output control system of the information handling system.

12. The system of claim 7, wherein the instructions executable by the processor are further configured for:
performing a many to many mapping of the plurality of VPN connections to the plurality of links, the many to many mapping being optimized for a multi-link configuration using network link attributes to determine which link is suited for assignment of a particular VPN connection.

13. A non-transitory, computer-readable storage medium embodying computer program code, the computer program code comprising computer executable instructions configured for:
establishing a plurality of virtual private network (VPN) connections via an information handling system;

obtaining a configuration policy for each of the plurality of VPN connections, the configuration policy for each of the plurality of VPN connections comprising an indication of at least one type of supported link of a plurality of links;

configuring a plurality of queues for packets being communicated via the plurality of virtual private network connections, the plurality of queues being greater than the plurality of VPN connections;

creating a tunnel indication for each of the plurality of VPN connections;

mapping the tunnel indication for each of the plurality of VPN connections to a respective queue of the plurality of queues; and, mapping each queue of the plurality of queues to a link of a particular VPN connection, the mapping using the configuration policy for each of the plurality of VPN connections.

14. The non-transitory, computer-readable storage medium of claim 13, wherein:
the traffic routing operation includes a user mode of operation, the user mode of operation executing an operating system service.

15. The non-transitory, computer-readable storage medium of claim 13, wherein:
the traffic routing operation includes a kernel mode of operation, the kernel mode of operation performing a multi-link network traffic operation, the multi-link network traffic operation interacting with an input/output control system.

16. The non-transitory, computer-readable storage medium of claim 15, wherein:
the input/output control system comprises a filtering platform, the filtering platform performing a network filtering operation.

17. The non-transitory, computer-readable storage medium of claim 13, wherein:
the input/output control system comprises a loadable kernel module, the loadable kernel module interacting with an input/output control system of the information handling system.

18. The non-transitory, computer-readable storage medium of claim 13, wherein the computer executable instructions are further configured for:
performing a many to many mapping of the plurality of VPN connections to the plurality of links, the many to many mapping being optimized for a multi-link configuration using network link attributes to determine which link is suited for assignment of a particular VPN connection.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *